US006954733B1

(12) United States Patent
Ellis et al.

(10) Patent No.: US 6,954,733 B1
(45) Date of Patent: Oct. 11, 2005

(54) INTERNET BASED COMPUTER SYSTEM AND METHOD FOR COMPONENT EXCHANGE

(75) Inventors: James S. Ellis, Laguna Niguel, CA (US); Wolfgang Nickl, Irvine, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/557,040

(22) Filed: Apr. 21, 2000

(51) Int. Cl.[7] .............................................. G06F 17/60
(52) U.S. Cl. ......................................... 705/26; 705/37
(58) Field of Search ............................. 705/26, 27, 37

(56) References Cited

U.S. PATENT DOCUMENTS

| 5,758,097 A | * | 5/1998 | Debe et al. .................... 705/35 |
| 5,950,176 A | * | 9/1999 | Keiser et al. .................. 705/37 |
| 6,029,146 A | * | 2/2000 | Hawkins et al. ............... 705/37 |
| 6,236,972 B1 | * | 5/2001 | Shkedy ......................... 705/26 |
| 6,408,282 B1 | * | 6/2002 | Buist ............................ 705/37 |
| 6,505,174 B1 | * | 1/2003 | Keiser et al. .................. 705/37 |
| 2001/0047322 A1 | * | 11/2001 | Plate et al. .................... 705/26 |

FOREIGN PATENT DOCUMENTS

| WO | 00/22548 | * | 4/2000 |
| WO | 00/75828 | * | 12/2000 |
| WO | 01/24089 | * | 4/2001 |

OTHER PUBLICATIONS

"Should Publishers Consider Retail Revenue Sharing With Online Networks?;" Multimedia Wire, v5, n142, Jul. 24, 1998.*

"Should Publishers Consider Retail Revenue Sharing With Online Networks;" Multimedia Wire; v5, n142, pN/A; Jul. 24, 1998.*

* cited by examiner

*Primary Examiner*—Jeffrey A. Smith
(74) *Attorney, Agent, or Firm*—Milad G. Shara, Esq.; Burns Doane Swecker & Mathis (57) ABSTRACT

A system and method for providing a computer component exchange in a network for executing buy orders for purchasing computer components is disclosed. A plurality of owner-processors are electrically connected to the network. At least a first owner-processor is adapted to transmit electronic buy orders through the network for purchasing computer components. At least a second owner-processor is adapted to receive buy orders from the network. The system comprises an exchange server complex that is electrically connected to the network having plurality of investment instruments comprising shares of ownership interests in the exchange server complex that are stored as data records in an accounting database. At least some of the owner-processors are capable of being associated with at least one of the shares, thereby defining an ownership interest in the exchange server complex for a proprietor of the respective owner-processor. Data stored in the accounting database represents allocation of net profits from fees charged for transactions in the exchange server complex among the owner-processors that are associated with the shares. The net-profits are represented as data records in the accounting database for tracking net profits earned in the exchange server complex. The system may use a standard data format for searching and exchanging buy orders and component specifications such as that described by ROSETTANET.

32 Claims, 4 Drawing Sheets

INTERNET BASED COMPUTER SYSTEM AND METHOD FOR COMPONENT EXCHANGE

BACKGROUND OF THE INVENTION

1. Field of the Invention

The invention relates to an Internet based computer system component exchange. More specifically, the invention comprises a system and method for providing an exchange server complex in a network for executing buy orders for purchasing computer components.

2. Description of the Prior Art and Related Information

As personal computers (PCs) have become more a part of people's everyday lives, sales have increased for PCs, thus creating a major market for those who assemble and sell them. At the same time, demand for computer components has increased, causing equal increases in manufacturing of those computer components. Such computer components as used herein may comprise both internal computer components such as processors, hard disk drives, floppy disk drives, memory chips and internal modems; or external computer components or peripherals such as printers, scanners and external modems. Further, due to the Internet and increased use other networks, the same market changes have occurred with respect to mid-range or server computers. Further, these computer components may comprise components at the computer assembly level, or sub-assembly level such as computer components for computer motherboards.

More recently, due to historical high demand, more and more sellers of computers, and manufacturers of computer components have entered the market. This has caused higher supplies of both computers and computer components to enter the market. This is especially so given the advent of computer component interface standards making these computer components more interchangeable. In effect, computer components have become less like specialty items directed toward proprietary computers, and more like interchangeable commodities. Thus, these market supply pressures have caused lower profit margins for both computer sellers who purchase computer components and computer component suppliers.

Heretofore, most business to business transactions for computer components have occurred through traditional channels such as sales calls and paper intensive negotiation. Such people intensive selling and buying techniques have thus become less and less practical. Heretofore, there has been a need for a system to lower costs of business to business transactions for the purchase of computer components.

On-line ordering systems have been devised in order to bring buyers and sellers together in a paperless or semi-paperless system for conducting on-line sales transactions. One such system for processing sales transactions is disclosed in U.S. Pat. No. 4,799,156 for an Interactive Market Management System. That patent discloses a plurality of buyers and a plurality of sellers which can be linked to each other by means of an interactive market management system (IMMS) for interactive communications. Each of the participating entities which is a subscriber to the system must always operate through the IMMS, which serves as a focal point or hub through which all transactions must be funneled.

In U.S. Pat. No. 5,557,518, a system is described for trusted agents for open electronic commerce. The system of this patent uses "money modules" to create a secure transaction environment for both the buyer and the seller of electronic merchandise and services. The primary objective of the patent is to provide a system which allows customers to buy electronic merchandise or services on demand without enrolling in an electronic community. In the described system, a customer and supplier trusted agent establish a secure session. The customer trusted agent communicates with a first money-module and the supplier trusted agent communicates with the second money-module. The supplier trusted agent delivers the electronic merchandise. The first money module transmits electronic money to the second money module. Upon successful completion of the money payment, the first money module informs the customer trusted agent, and the second money module informs the supplier trusted agent. The supplier then logs the sale and the customer may use the purchased electronic merchandise.

In U.S. Pat. No. 5,319,542, a system for ordering items using an electronic catalog is disclosed. The system of this patent establishes a private catalog resident on a customer's computer system. The customer can electronically requisition a product based on the information provided in the catalog and route or requisition through the appropriate approval process within the enterprise. The requisitions are then processed through the customer's procurement system and transmitted electronically as purchase orders to the supplier.

In U.S. Pat. No. 5,592,378, a computerized order entry system and method is disclosed which includes a plurality of servers, data entry devices, back-end systems and data bases. The computer order entry system is intended to permit placement of orders by capturing order information and storing the order information through the data capture mechanism. This is accomplished by a sequence of steps to search multiple search categories.

U.S. Pat. No. 5,970,475 provides for an automated procurement system used by employees within an organization to acquire goods and services that they require.

However, none of the systems described above are specifically tailored to enabling computer component business to business exchange. Further, none of the above described systems provide for financial rewards for using an on-line exchange system. Further, none of the above-described systems provide for ownership of the on-line exchange system by the businesses participating in the exchange, rewarding those businesses that use the exchange more often. Further, none of the above described systems offer larger percentages of ownership of the on-line exchange system based on successful referrals to the exchange system. Further, none of the above described systems provide for payments of referral fees from value added resources based on that value added resources' participation in a transaction from the exchange system.

SUMMARY OF THE INVENTION

A system and method for providing a computer component exchange in a network for executing buy orders for purchasing computer components is disclosed. A plurality of processors, also called owner-processors herein, are electrically connected to the network. At least a first owner-processor is adapted to transmit electronic buy orders through the network for purchasing computer components. At least a second owner-processor is adapted to receive buy orders from the network.

The system comprises one or more servers, called a server or an exchange server complex herein, that is electrically connected to the network. A plurality of investment instruments comprising shares of ownership interests in the exchange server complex are stored as data records in an accounting database. At least some of the owner-processors are capable of being associated with at least one of the shares, thereby defining an ownership interest in the exchange server complex for a proprietor of the respective owner-processor. The accounting database is stored on one of the servers of the exchange server complex for storing data representing allocation of profits among the owner-processors that are associated with the shares, also called investment instruments herein. The profits are collected and calculated from fees charged for transactions completed in the exchange server complex. The profits are represented as data records in the database for tracking such earned profits.

The system further comprises one or more computer programs, collectively called a computer program herein, for execution on one or more of the servers in the server complex, the computer program having a plurality of functions or modules. Each of the modules comprises an executable set of instructions for execution in the exchange server complex. One of the modules comprises a means for receiving one or more buy orders for computer components from the first owner-processor, the first owner-processor thereby comprising a buyer's owner-processor. Another module comprises a means for matching the one or more buy orders with the second owner-processor, the second owner-processor comprising a seller's owner-processor. Another module comprises a means for calculating a fee for matching the buy order with the second owner-processor. Another module comprises a means for charging the calculated fee to at least the first or second owner-processors, or to both the first and second processors. Another module comprises a means for calculating a net profit resulting from charging the calculated fee. Another module comprises a means for apportioning the net profit based on the number of shares associated with each owner-processor. Another module comprises a means for updating the accounting database based on the apportioning of the net profit. The updating is accomplished by relating net profits with the share records through a relational means such as a relational database management system (RDBMS).

DETAILED DESCRIPTION OF THE PREFERRED EMBODIMENTS

Figure 1:
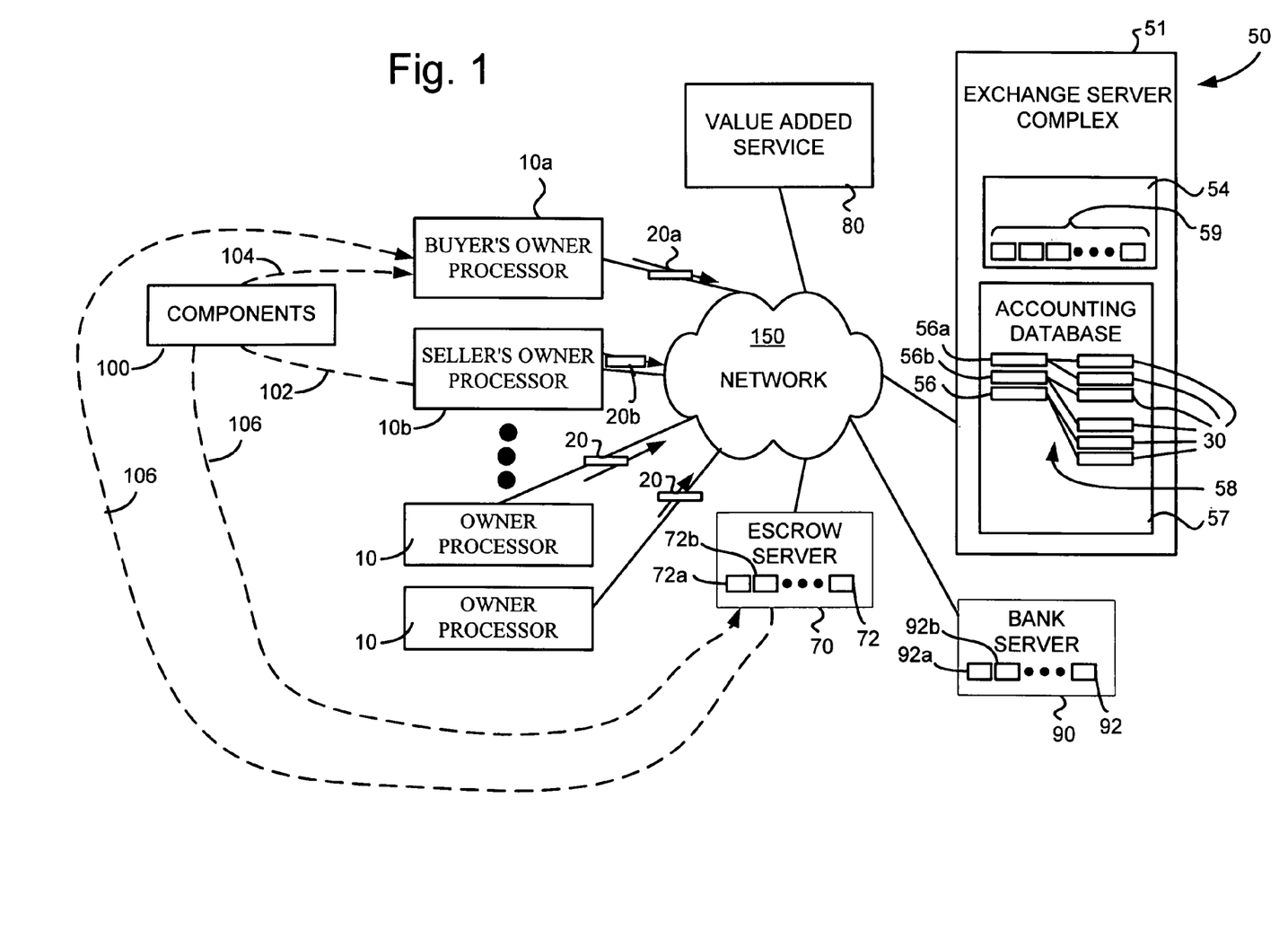
FIG. 1 is a block diagram illustrating a system for computer component exchange in a network for executing buy orders for purchasing computer components.

With reference to FIG. 1, a block diagram illustrating a system 50 for computer component exchange in a network 150 for executing buy orders 20*a* for purchasing computer components 100 is shown. A plurality of owner-processors 10*a*, 10*b*, 10 are electrically connected to the network 150. At least a first owner-processor 10*a* is adapted to transmit electronic buy orders 20*a*, 20 through the network 150 for purchasing computer components 100. At least a second owner-processor 10*b* is adapted to receive buy orders 20*a*, 20 from the network 150.

The system comprises an exchange server complex 51 that is electrically connected to the network 150. A plurality of investment instruments 56*a*, 56*b*, 56 comprising shares of ownership interests in the exchange server complex 51 are stored as data records in an accounting database 57. At least one of the shares 56*a* is associated with the first or the second owner-processor 10*a*, 10*b*. In FIG. 1, the first owner-processor 10*a* is associated with a share indicated at 56*a*, and the second owner-processor 10*b* is associated with a share indicated at 56*b*. An accounting database 57 is stored on the exchange server complex for storing data representing allocation of profits 30 from operation of the exchange server complex 51 among the owner-processors 10*a*, 10*b* and 10 that are associated with the investment instruments 56*a*, 56*b* and 56. The profits 30 are represented as data records in the accounting database 57 for tracking such earned profits 30.

The system further comprises a computer program 54 having a plurality of functions or modules 59. The computer program 54 may comprise a plurality of computer programs 54 for execution in a plurality of servers in the exchange server complex 51. Each of the modules 59 comprises an executable set of instructions for execution in the exchange server complex 51. One of the modules 59 comprises a means for receiving one or more buy orders 20*a* for computer components 100 from the first owner-processor 10*a*, the first owner-processor 10*a* thereby comprising a buyer's owner-processor 10*a*. Another module 59 comprises a means for matching the one or more buy orders with the second owner-processor 10*b*, the second owner-processor 10*b* comprising a seller's owner-processor 10*b*. Another module 59 comprises a means for calculating a fee for matching the buy order 20*a* with the second owner-processor 10*b*. Another module 59 comprises a means for charging the calculated fee to at least the first or second owner-processors 10*a* or 10*b*, or to both the first and second processors 10*a* and 10*b*. Another module 59 comprises a means for calculating a net profit 30 resulting from charging the calculated fee. Another module 59 comprises a means for apportioning the net profit 30 based on the number of shares 56*a*, 56*b*, 56 associated with each owner-processor 10*a*, 10*b*, 10. Another module 59 comprises a means for updating the accounting database 57 based on the apportioning of the net profit 30. The updating is accomplished by relating net profits 30 with the share records 56*a*, 56*b*, 56 through a relational means 56 such as a relational database management system (RDBMS).

According to the above described system 50, the investment instruments 56*a*, 56*b*, 56 comprise means for providing incentive for proprietors of the owner-processors 10*a*, 10*b*, 10 to place or receive buy orders 20*a* with the exchange server complex 51.

One of the modules 59 may comprise a means for associating at least one additional share 56 to each owner-processor 10 if the proprietor of the respective owner-processor 10 refers a threshold number of other owner-processors 10 to transmit buy orders 20 to the exchange server complex 51. For example, the referral may be accomplished through an automated referral from the respective owner-processor 10, wherein the exchange server complex 54 is able to detect a referral source within a web page link from the referring owner-processor 10.

One of the modules 59 may comprise a means for withdrawing payment for the second owner-processor 10*b* from an electronic escrow account 72*a* associated with the first owner-processor 10*a* after the proprietor of the first owner-processor 10*a* receives the computer components 100 that the buy order 20*a* was for. Normally, without using the escrow agent 70, the components follow the path indicated at 102 and 104, wherein the components are shipped from a proprietor of the second owner-processor 10*b* to a proprietor of the first owner-processor 10*a*. However, using the module 59 that provides escrow functionality, the computer components follow the path indicated at 106, wherein the components are first shipped to the proprietor of the escrow agent server 70, and then to the proprietor of the first owner-processor 10*a* after payment is received at the escrow agent server 70. Similarly, each of the other owner-processors 10*b*, 10 may be associated with an escrow account 72*b*, 72 to provide for escrow functionality.

A bank server 90 may be electrically connected to the network 150. Such a bank server 150 may comprise one that is adapted to allow for secure electronic transactions such as CHASE ONLINE BANKING by the Chase Manhattan Bank of New York, N.Y. The module 59 for charging the calculated fee may comprise a means for electronically debiting a first bank account 92*a* associated with the first owner-processor 10*a*, a second bank account 92*b* associated with the second owner-processor 10*b*, or both the first bank account 92*a* and the second bank account 92*b*. Other owner-processors 10 may have bank accounts 10 associated with them that can be electronically debited.

Similar to debit operation performed by the module 59 for charging, for module 59 for apportioning may electronically credit a bank account 92 associated with each of the plurality of owner-processors 10 that are associated with shares 30 based on the number of shares 30 associated with each respective owner-processor 10.

The module 59 for matching may match a set of requirements in the buy order 20*a* with the second owner-processor 10*b* if the second owner-processor indicates that a proprietor of the second owner-processor 10*b* is able to supply computer components 100 that meet the set of requirements. The second processor 10*b* may indicate so with a set of specifications 20*b* transmitted to the exchange server complex 51 as a data stream or set of packets. The buy order 20*a* and specifications 20*b* may be formatted into an electronic commerce standard format. The electronic commerce standard format comprises a bill of materials format as described by a ROSETTANET industry standard which may be found at www.rosettanet.org.

One of the modules 59 may comprise a means for referring the first and second owner-processors 10*a*–10*b* to a value added service 80. The referring module 59 may charge a referral fee to the value added service 80 when the first and second owner-processors 10*a*–10*b* are referred to the value added service 80. The module 59 for apportioning is further for apportioning the fee received from the value added service 80 as part of the net profits 30 among the owner-processors 10*a*, 10*b* 10 based on the number of shares 56*a*, 56*b*, 56 associated with each owner-processor 10*a*, 10*b*, 10. The value added service 80 may comprise, for example, a scheduling server for a computer component shipping agent for providing transportation of the computer components 100 that are for the buy order 20*a* from a proprietor of the second owner-processor 10*b* to the proprietor of the first owner-processor 10*a*.

One of the modules 59 may comprise a means for publishing statistics based on a plurality of buy orders 20 received from a plurality of owner-processors 10 that are each matched with at least one other owner-processor 10. The module for publishing may produce an electronic ticker tape for display on an attached monitor of one or more of the owner-processors 10 for informing the proprietor of each respective owner-processor 10 of closing prices per unit by type of computer component in the latest buy order 20 in time that was matched with an owner-processor 10 for each type of computer component.

Figure 2:
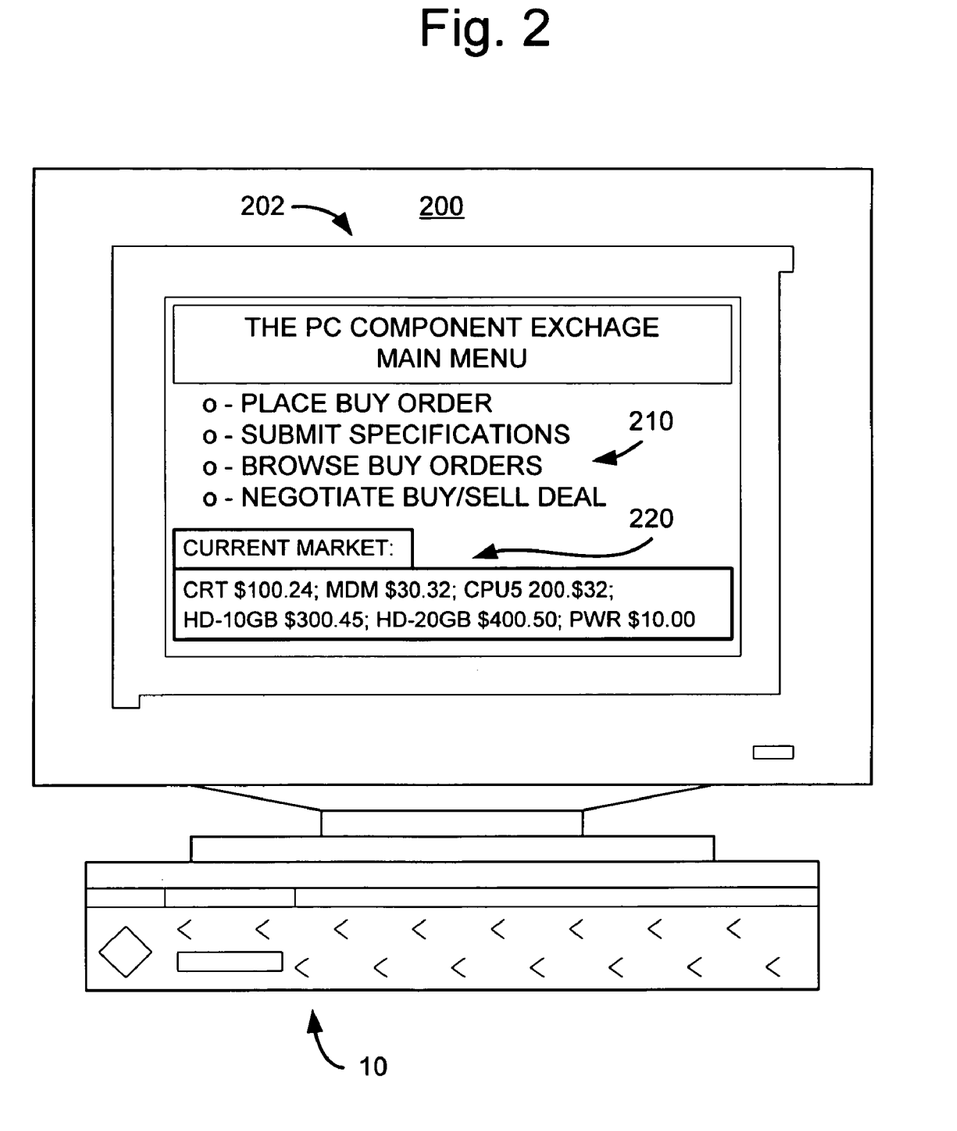
FIG. 2 is a front view of an owner-processor executing a network or Internet browser for accessing the system of FIG. 1.

With reference to FIG. 2, a front diagrammatic view of an owner-processor 10 executing a network, or Internet, browser 202 is shown. The owner-processor 10 may comprise a CISC based system such as a personal computer (PC) executing the NETSCAPE browser by Netscape, Inc. of Mountain View, Calif., or RISC based system such as a SUN workstation by Sun Microsystems, Inc. of San Jose, Calif. executing the INTERNET EXPLORER browser by the Microsoft Corporation of Bellevue, Wash., or other HTML, XML, or Java compliant combination of hardware and software. The owner-processor 10 includes a monitor 200 for presenting the browser 202 and a client module (one of 59 in FIG. 1) of computer program 54 executing in the browser 202. The client module 59 may include one or more applets written in JAVA, ACTIVE X or other browser compliant languages for controlling client functions.

In FIG. 2, a main menu 210 of the system is presented to allow the proprietor of the owner-processor 10 to execute a variety of modules 59, for example, a module 59 for placing a buy order 20, submitting computer component specifications 20*b* that the owner-processor 10 is making available for sale, browsing buy orders 20 submitted by other owner-processors 10, or negotiating a buy or sell deal with another owner-processor 10. The module 59 for publishing is presenting a continuously updating ticker tape in the browser 202. The ticker tape 220 displays the current market prices for computer components based on the latest matches or sales executed on the exchange server complex 51. The ticker tape 220 may be self-updating by using means such as a JAVA applet or other browser executable software such as ACTIVE X.

Figure 3:
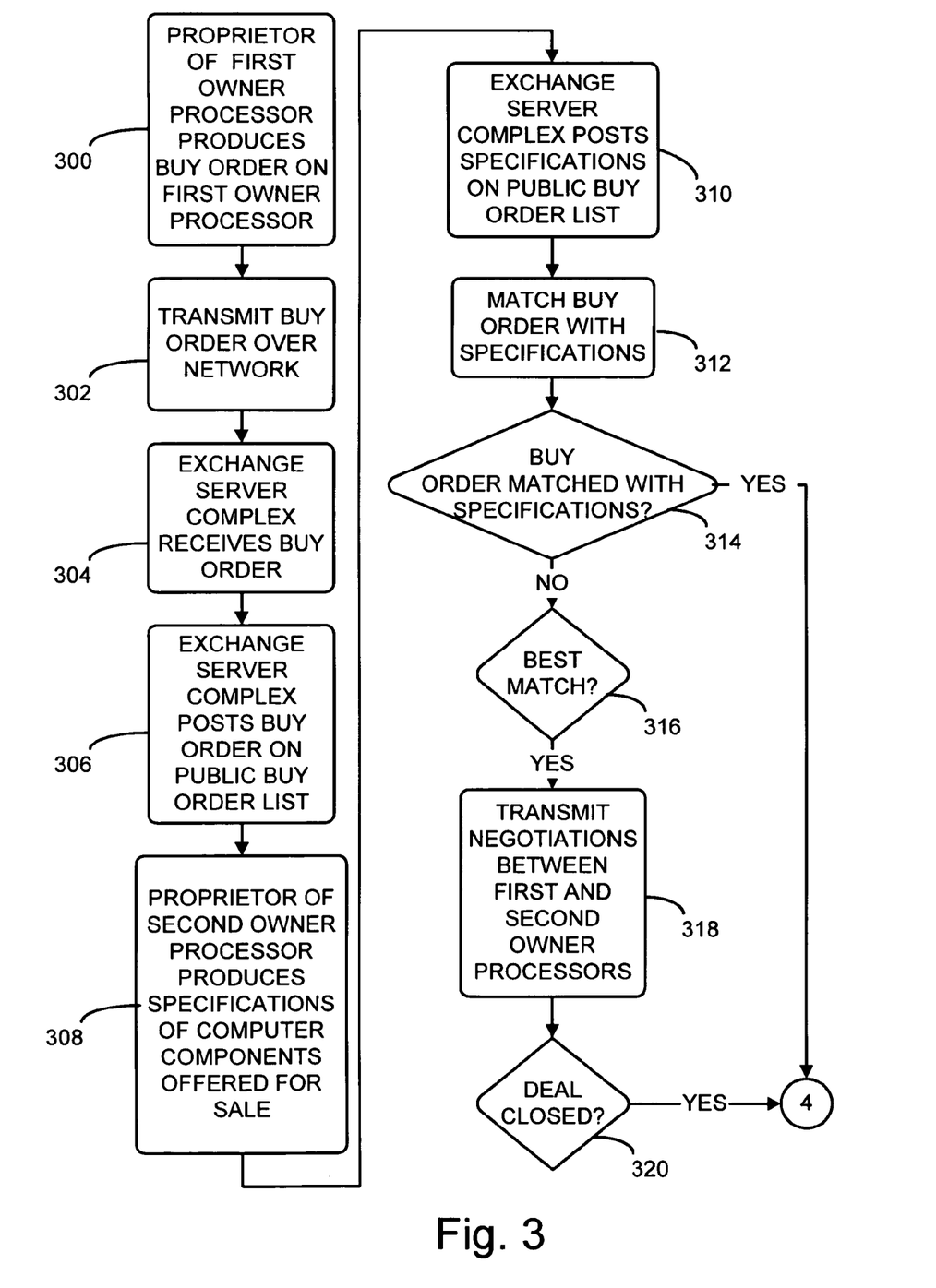
FIGS. 3–4 show flow diagrams illustrating the steps in a method performed in the system of FIG. 1.
Figure 4:
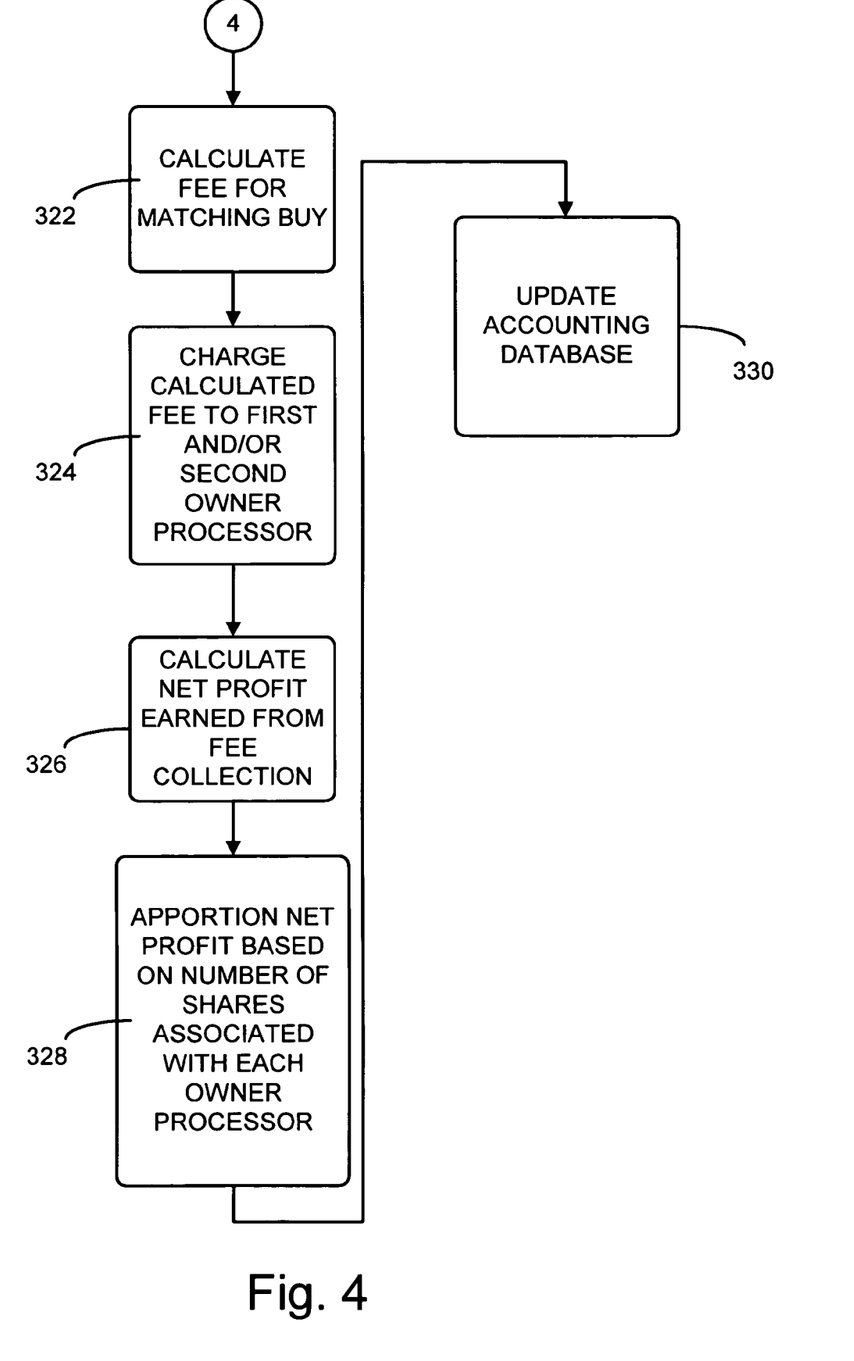

With reference to FIGS. 3–4, a flow diagram illustrating the steps in a method performed in the system of FIG. 1 for receiving and matching a buy order 20 is shown. The proprietor of the first owner-processor 10*a* produces a buy order 20*a*, step 300. The buy order 20*a* is transmitted over the network 150 to the exchange server complex 51, step 302. The exchange server complex 51 receives the buy order 20, step 304. The exchange server complex posts the buy order 20 in an on-line public buy order list, step 306. The buy order list may comprise a table in the accounting database 57, or a RDBMS separate from the accounting database 57. The proprietor of the second owner-processor 20*b* may produce one or more specifications 20*b* of computer components 100 that it offers, step 308. Similar to the buy orders 20*a*, the specifications are posted and stored in a specifications lists that may comprise a table in the accounting database 57, or a RDBMS separate from the accounting database 57, step 310.

The computer program 54 attempts to match the buy order 20*a* with the specifications 20*b* posted. The computer program 54 compares such requirements of the buy order such as type of computer component, price, warranty and other requirements with a posted specifications entry 20*b* defining the same, including an offering price, step 312. If an exact match is not found, step 314, for example, if the price offered in the specifications entry 20*b* is higher than the requirements price in the buy order 20*a*, 314, the closest or best match is located for the buy order 20*a*, step 316. If a best match is found in step 316, then the system sets up negotiations between the first and second owner-processors, 10*a* and 10*b*, step 318, assuming that the second owner-processor 10*b* presents the best match for the buy order 20*a*. Negotiations may be facilitated using electronic mail through the exchange server complex 51, a real-time message program such as INSTANT MESSAGENGER by America On Line, Inc. of Dulles, Va., or by providing contact information to both owner-processors 20a and 20b.

If a deal is closed between the first and second owner-processors 10a and 10b or the match was initially successful in step 314, the processing moves to FIG. 4, where a fee, or finders fee, is calculated for matching the buy order 20a to the second owner-processor 20b or specifications 20b, step 322. The fee may be calculated according to the size of the buy order 20 in units of computer components 100, the total price of the buy order 20 or on a flat fee basis. The calculated fee is charged to either or both owner-processors, step 324. Charging of the fee may be accomplished by a simple paper billing procedure, or through an electronic debit from the owner-processors' 20a, 20b bank accounts 92a and 92b in FIG. 1.

The net profit from the transaction just described is calculated by the computer program, step 326. The net profit 30 from the transaction may be calculated as:

$$np = fee - ct$$

where np is the net profit 30 from the transaction, the fee is the fee calculated in step 322, and ct is the cost of the transaction. The cost of the transaction may be the estimated or calculated cost of operating the exchange server complex 51 for a fixed period divided by the average number of transactions in that period, or:

$$ct = co/trn$$

wherein co is the cost of operating the exchange server complex 51 for the fixed period of time, and trn is the number of transactions for that period. Once the net profit 30 is calculated, the computer program 54 apportions the net profit 30 based on the number of shares associated with each owner-processor 10a, 10b, 10. Apportionment is represented by updating the profit database records (indicated by 30 in FIG. 1) in the accounting database 57, step 330. Alternatively, net profits may be directly distributed to the bank accounts 92a, 92b, 92 of owner-processor 10a, 10b, 10 that are associated with the investment instruments or shares 56a, 56b, 56 indicating ownership in the exchange server complex 51.

In an alternative embodiment, the module 59 for matching buy orders 20a and sell orders 20b may comprise a module 59 for matching bids 20a and offers 20b for an on-line auction conducted in the exchange server complex 51. Such an auction may alternatively comprise a reverse auction in which the buyer's owner-processor 10a submits a price as part of the bid 20a that the proprietor of the owner-processor 10a is willing to pay. In this embodiment, the exchange server complex 51 receives a bid 20a comprising a price that the proprietor of the owner-processor 10a is willing to pay, among other computer component specifications. The module 59 for matching buy orders 20a allows proprietors of the seller's owner-processor 10b view the bid 20a, among other bids 20 received from other owner-processors 10, to accept the highest price for selling the components 100. Alternatively, the seller's owner-processor 10b may submit a lowest offer price 20b that the proprietor of the seller's owner-processor 10b would be willing to accept for the computer components 100, the module 59 for matching only accepting bids 20a, 20 that meet or exceed that lowest offer price 20b.

What is claimed is:

1. A system for computer component exchange in a network for executing buy orders for purchasing computer components, wherein the network is electrically connectable to a plurality of owner-processors, the owner-processors having proprietors, at least one proprietor having an ownership interest in the computer component exchange, at least a first owner-processor adaptable to transmit electronic buy orders through the network for purchasing computer components, at least a second owner-processor adaptable to receive buy orders from the network, comprising an exchange server complex electrically connected to the network; and an accounting database for storing a plurality of investment instruments comprising shares of ownership interests in the exchange server complex, at least one of the shares associated with the first or the second owner-processor thereby representing the ownership interest in the exchange server complex for the proprietor of the respective owner-processor; and for storing accounting data representing allocation of net profits among the owner-processors that are associated with the shares, the net profits being extracted from fees charged for transactions in the exchange server complex;

wherein the exchange server complex comprises:

a) a means for receiving one or more buy orders for computer components from the first owner-processor;

b) a means for matching the one or more buy orders with the second owner-processor;

c) a means for calculating a fee for matching the buy order d) a means for charging the calculated fee to at least the first or second owner-processor, or to both the first and second processors;

e) a means for calculating a net profit resulting from charging the calculated fee;

f) a means for apportioning the net profit based on the number of shares associated with each owner-processor; and g) a means for updating the accounting database based on the apportioning of the net profit.

2. The system of claim 1, wherein the investment instruments comprise incentives for proprietors of the owner-processors to place or receive buy orders with the exchange server complex.

3. The system of claim 2, wherein computer program includes a means for associating at least one additional share to each owner-processor if the respective owner-processor or the proprietor of the respective owner-processor refers a threshold number of other owner-processors to transmit buy orders to the exchange server complex.

4. The system of claim 1, wherein the computer program further comprises a means for withdrawing payment for the second owner-processor from an electronic escrow account associated with the first owner-processor after the proprietor of the first owner-processor receives the computer components that the buy order was for.

5. The system of claim 1, wherein the means for charging the calculated fee comprises a means for electronically debiting a bank account associated with the first owner-processor.

6. The system of claim 1, wherein the means for charging the calculated fee comprises a means for electronically debiting a bank account associated with the second owner-processor.

7. The system of claim 1, wherein the means for charging the calculated fee comprises a means for electronically debiting a first bank account associated with the first owner-processor and a second bank account associated with the second owner-processor.

8. The system of claim 1, wherein the means for apportioning comprises a means for electronically crediting a bank account associated with each of the plurality of owner-processors that are associated with shares based on the number of shares associated with each respective owner-processor.

9. The system of claim 1, wherein the means for matching comprises a matching software module that is executable on the exchange server complex for matching a set of requirements in the buy order with the second owner-processor if the second owner-processor indicates that a proprietor of the second owner-processor is able to supply computer components that meet the set of requirements.

10. The system of claim 9, wherein the set of requirements are in an electronic commerce standard format.

11. The system of claim 10, wherein the electronic commerce standard format comprises a bill of materials format wherein the format is ROSETTANET.

12. The system of claim 11, comprising a means for referring either of the first or second owner-processors to a value added service.

13. The system of claim 12, wherein the computer program is for charging a referral fee to the value added service when either of the first or second owner-processors are referred to the value added service.

14. The system of claim 13, wherein the means for apportioning is further for apportioning the fee received from the value added service as part of the net profit among the owner-processors based on the number of shares associated with each owner-processor.

15. The system of claim 14, wherein the value added service comprises a computer component shipping agent for providing transportation of the computer components that are for the buy order, the computer components being shipped from a proprietor of the second owner-processor to the proprietor of the first owner-processor.

16. The system of claim 1, further comprising a means for publishing statistics based on a plurality of buy orders received from a plurality of owner-processors that are each matched with at least one other owner-processor.

17. The system of claim 16, wherein the means for publishing is an electronic ticker tape for display on an attached monitor of one or more of the owner-processors for informing a proprietor of each respective owner-processor of closing prices per unit by type of computer component in the latest buy order in time that was matched with an owner-processor for each type of computer component.

18. In an exchange server complex for computer component exchange in a network, a method for executing buy orders for purchasing computer components, wherein the network is electrically connectable to a plurality of owner-processors, the owner-processors having proprietors, at least one proprietor having an ownership interest in the computer component exchange, wherein each of the plurality of owner-processors are capable of being associated with one or more shares representing the respective proprietor's ownership in the exchange server complex, at least a first owner-processor adaptable to transmit electronic buy orders through the network for purchasing computer components, at least a second owner-processor adaptable to receive buy orders from the network, the method comprising the steps of:

receiving one or more buy orders for computer components from the first owner-processor;

matching the one or more buy orders with a second owner-processor using a computer;

calculating a fee, using a computer, for matching the buy order with the second owner-processor;

charging the calculated fee to at least the first or second owner-processor, or to both the first and second owner-processors;

calculating a net profit resulting from charging the calculated fee; and apportioning the net profit based on the number of shares associated with each owner-processor.

19. The method of claim 18, comprising providing incentives for the proprietors of each of the owner-processors to place or receive buy orders with the exchange server complex by associating one or more shares with the owner-processors that place or receive a threshold number of buy orders.

20. The method of claim 18, comprising withdrawing payment for the second owner-processor from an electronic escrow account associated with the first owner-processor after the proprietor of the first owner-processor receives the computer components that the buy order was for.

21. The method of claim 18, wherein the step of charging the calculated fee comprises electronically debiting a bank account associated with the first owner-processor.

22. The method of claim 18, wherein step of charging the calculated fee comprises electronically debiting a bank account associated with the second owner-processor.

23. The method of claim 18, wherein the step of charging the calculated fee comprises electronically debiting a first bank account associated with the first owner-processor and a second bank account associated with the second owner-processor.

24. The method of claim 18, wherein the step of matching comprises matching a set of requirements in the buy order with the second owner-processor if the second owner-processor indicates that a proprietor of the second owner-processor is able to supply computer components that meet the set of requirements.

25. The method of claim 24, wherein the set of requirements are in an electronic commerce standard format.

26. The method of claim 25, wherein the electronic commerce standard format comprises a bill of materials format wherein the format is ROSETTANET.

27. The method of claim 18, comprising referring either the first, second or both the first and second owner-processors to a value added service.

28. The method of claim 27, comprising charging a referral fee to the value added service after the step of referring.

29. The method of claim 28, comprising apportioning the fee received from the value added service as part of the net profit among the owner-processors based on the number of shares associated with each owner-processor.

30. The method of claim 29, wherein the value added service comprises a computer component shipping agent for providing transportation of the computer components that are for the buy order, the computer components being shipped from a proprietor of the second owner-processor to the proprietor of the first owner-processor.

31. The method of claim 18, comprising publishing statistics based on a plurality of buy orders received from a plurality of the owner-processors that are each matched with at least one other owner-processor, wherein the step of publishing comprises presenting an electronic ticker tape for display on an attached monitor of one or more of the owner-processors for informing a proprietor of each respective owner-processor of closing prices per unit by type of computer component in the latest buy order in time that was matched with an owner-processor for each type of computer component.

32. The method of claim 18, wherein the step of apportioning comprises electronically crediting a bank account associated with each of the plurality of owner-processors that are associated with shares based on the number of shares associated with each respective owner-processor.

* * * * *